(12) United States Patent
Mcloughlin et al.

(10) Patent No.: US 11,996,280 B2
(45) Date of Patent: May 28, 2024

(54) METHODS AND SYSTEMS FOR DETECTING AEROSOL PARTICLES WITHOUT USING COMPLEX ORGANIC MALDI MATRICES

(71) Applicant: Zeteo Tech, Inc., Sykesville, MD (US)

(72) Inventors: Michael Mcloughlin, Sykesville, MD (US); Wayne A. Bryden, Sykesville, MD (US); Charles J. Call, Sykesville, MD (US); Dapeng Chen, Sykesville, MD (US)

(73) Assignee: ZETEO TECH, INC., Sykesville, MD (US)

( * ) Notice: Subject to any disclaimer, the term of this patent is extended or adjusted under 35 U.S.C. 154(b) by 0 days.

(21) Appl. No.: 17/623,598

(22) PCT Filed: Jun. 27, 2020

(86) PCT No.: PCT/US2020/040023
§ 371 (c)(1),
(2) Date: Dec. 28, 2021

(87) PCT Pub. No.: WO2021/061247
PCT Pub. Date: Apr. 1, 2021

(65) Prior Publication Data
US 2022/0252545 A1 Aug. 11, 2022

Related U.S. Application Data

(60) Provisional application No. 62/868,906, filed on Jun. 29, 2019.

(51) Int. Cl.
*H01J 49/16* (2006.01)
*G01N 15/10* (2006.01)
(Continued)

(52) U.S. Cl.
CPC ............ *H01J 49/164* (2013.01); *G01N 15/10* (2013.01); *G01N 27/64* (2013.01);
(Continued)

(58) Field of Classification Search
CPC ...... H01J 49/164; H01J 49/0036; H01J 49/40; H01J 49/162; G01N 15/10; G01N 27/64;
(Continued)

(56) References Cited

U.S. PATENT DOCUMENTS

| 5,382,794 A | * | 1/1995 | Downey | ............. | H01J 49/0422 |
| | | | | | 250/423 P |
| 5,681,752 A | * | 10/1997 | Prather | ............... | H01J 49/0022 |
| | | | | | 250/281 |

(Continued)

FOREIGN PATENT DOCUMENTS

| JP | 2018533169 | 11/2018 |
| KR | 10-1508146 B1 | 4/2015 |
| WO | WO2009097064 A2 | 8/2009 |

OTHER PUBLICATIONS

Passig et al., "Aerosol mass spectrometer for simultaneous detection of polyaromatic hydrocarbons and inorganic components from individual particles" 2017 (Year: 2017).*

(Continued)

*Primary Examiner* — Michael J Logie
(74) *Attorney, Agent, or Firm* — Paradice & Li LLP; Anand S. Chellappa (57) ABSTRACT

Disclosed are systems are methods for identifying the composition of single aerosol particles, particularly that of bioaerosol particles, without pre-treatment using complex organic MALDI matrices. A continuous timing laser may be used to index aerosol particles, measure particle properties, and trigger a pulse ionization laser. Ionized fragments and optionally photons associated with each particle producing (Continued)

by the ionization laser may be analyzed using one or more detectors including a TOF-MS detector and an optical detector. The laser pulse may comprise a simultaneous IR and UV laser pulse when fragments comprise predominantly of UV chromophores. Unique spectral data associated with each indexed particle from each detector may be compiled using data fusion to generate compiled spectral data. Machine learning methods may be used to improve the prediction of composition over time.

16 Claims, 7 Drawing Sheets

(51) Int. Cl.
    *G01N 27/64*     (2006.01)
    *H01J 49/00*     (2006.01)
    *H01J 49/40*     (2006.01)

(52) U.S. Cl.
    CPC .......... *H01J 49/0036* (2013.01); *H01J 49/40* (2013.01); *G01N 2015/1029* (2024.01); *G01N 2015/103* (2024.01)

(58) Field of Classification Search
    CPC ..... G01N 2015/1029; G01N 2015/103; G01N 15/1459; G01N 21/718; G01N 2015/1493; G01N 2015/1497; G01N 27/628
    See application file for complete search history.

(56) References Cited

U.S. PATENT DOCUMENTS

| | | | |
|---|---|---|---|
| 6,799,119 B1* | 9/2004 | Voorhees | G16H 50/20 435/6.12 |
| 7,260,483 B2 | 8/2007 | Gard et al. | |
| 10,354,851 B2 | 7/2019 | Moellers | |
| 10,541,119 B2 | 1/2020 | Strubel et al. | |
| 2002/0042075 A1* | 4/2002 | Nelson | G01N 33/54373 435/6.12 |
| 2004/0056188 A1 | 3/2004 | Reents et al. | |
| 2004/0075049 A1* | 4/2004 | Stowers | H01J 49/40 250/282 |
| 2005/0035285 A1* | 2/2005 | Tan | H01J 49/164 250/288 |
| 2005/0230615 A1* | 10/2005 | Furutani | H01J 49/0445 250/288 |
| 2008/0022853 A1 | 1/2008 | Ariessohn | |
| 2008/0251711 A1* | 10/2008 | Reilly | H01J 49/067 250/282 |
| 2009/0250606 A1* | 10/2009 | Fergenson | H01J 49/0445 250/282 |
| 2011/0049352 A1 | 3/2011 | Ding | |
| 2011/0071764 A1* | 3/2011 | Prather | H01J 49/40 250/281 |
| 2011/0116090 A1* | 5/2011 | Fergenson | G01N 1/4022 356/336 |
| 2014/0341780 A1 | 11/2014 | Ishii | |
| 2017/0243728 A1 | 8/2017 | Makarov | |
| 2018/0294149 A1 | 10/2018 | Rohner | |
| 2019/0267225 A1 | 8/2019 | Riedel et al. | |
| 2020/0232984 A1 | 7/2020 | Parchen et al. | |
| 2020/0328072 A1* | 10/2020 | Williams | H01J 49/14 |
| 2021/0134574 A1* | 5/2021 | Zimmermann | H01J 49/0095 |
| 2022/0044921 A1 | 2/2022 | McLoughlin et al. | |

OTHER PUBLICATIONS

Schade et al., "Spatially shaped laser pulses for the simultaneous detection of polycyclic aromatic hydrocarbons as well as positive and negative ionorganic ions in single particle mass spectrometry", analytical chemistry, Jun. 28, 2019 (Year: 2019).*
Costa et al., "A machine learning approach to aerosol classification for single-particle mass spectrometry", Atmos. Meas. Tech. 2018 (Year: 2018).*
Costa, a machine learning approach to aerosol classification for single-particle mass spectrometry, Atmos. Meas. Tech., 2018 (Year: 2018).*
International Preliminary Report on Patentability (IPEA/KR) dated Nov. 29, 2021 for PCT/US2020/040023 (with annex).
Wan G-H, Wu C-L, Chen Y-F, Huang S-H, Wang Y-L, et al. (2014), "Particle Size Concentration Distribution and Influences on Exhaled Breath Particles in Mechanically Ventilated Patients," PLoS One 9(1): e87088.
Castanedo, F., "A Review of Data Fusion Techniques," The Scientific World Journal, 2013.
Warschat, C. et al., "Mass Spectrometry of Levitated Droplets by Thermally Unconfined Infrared-Laser Desorption," 4 Anal. Chem. 2015, 87, 8323-8327.
ATI Air Techniques International, Polaron F10, Real-Time Bioaerosol Sensor, data sheet, 2—pages.
Huffman et al., "Fluorescent biological aerosol particle concentrations and size distributions measured with an Ultraviolet Aerodynamic Particle Sizer (UV-APS) in Central Europe," Atmos. Chem. Phys., 10, 3215-3233, https://doi.org/10.5194/acp-10-3215-2010. (Year: 2010).
Prather, Aerosol Time-of-Flight Mass Spectrometry (ATOFMS) as a Real-Time Monitor of Individual Aerosol Particles in Field Studies, Final Report, prepared Mar. 1998, final edits Aug. 2001, 91—pages. (Year: 2001).
Teledyne FLIR Defense Technologies, IBAC 2 System, Bio-Threat Detection and Collection, data sheet, 2—pages, revised on Nov. 10, 2021.
Skyes et al., "Thermal Vaporization-Vacuum Ultraviolet Laser Ionization Time-of-Flight Mass Spectrometry of Single Aerosol Particles," Analytical Chemistry, American Chemical Society, US, vol. 74, No. 9, May 1, 2002, pp. 2048-2052 (Year: 2002).
Morris, J.S. et al., "Feature Extraction and Quantification for Mass Spectrometry in Biomedical Applications using the Mean Spectrum," Bioinformatics, 2005, 21(9), p. 1764-1775.
International Search Report and Written Opinion dated Mar. 2, 2023 for PCT/US2022/047266.
International Preliminary Report on Patentability (IPEA/KR) dated Dec. 4, 2023 for PCT/US2022/047266 (with Annex).

* cited by examiner

METHODS AND SYSTEMS FOR DETECTING AEROSOL PARTICLES WITHOUT USING COMPLEX ORGANIC MALDI MATRICES

RELATED APPLICATIONS

This application is a U.S. National Stage Application of International Application No. PCT/US2020/040023, filed Jun. 27, 2020, which is related to and claims the benefit of U.S. Provisional Application No. 62/868,906, filed Jun. 29, 2019, and titled "Methods and Systems for Detection of Aerosol Particles Without Using Complex Organic MALDI Matrices," the entire disclosure of which is hereby incorporated by reference in its entirety.

FEDERALLY SPONSORED RESEARCH AND DEVELOPMENT

None.

FIELD

This disclosure relates to methods and devices that use mass spectrometry and one or more optical detection methods to provide high accuracy identification of aerosol analyte particles. More particularly, but not by way of limitation, the present disclosure relates to methods and devices for identifying biological aerosol analytes using at least one of a time-of-flight mass spectrometry (TOF-MS), optical single particle sensors, and a data analysis system capable of data fusion of data generated from the one or more sensors and identification of analyte particles using machine learning methods.

BACKGROUND

The threat from aerosolized biological and chemical threat agents remains a key concern of the U.S. Government because of the potentially dire consequences to life and property that may result from such an event. Two prime threat scenarios of particular concern are: (1) release of an agent inside an enclosed structure (e.g., office building, airport, mass transit facility) where HVAC systems could effectively distribute the agents through the entire structure and, (2) wide area release of an agent across an inhabited area such as a town or city. Exposure to the released aerosolized agent could lead to mass casualties. In a wide area release, it is extremely difficult to protect citizens from the initial exposure without timely information about the type of contaminant, quantity, and location of the contaminant. Methods and devices to identify the composition of the threat agents in real time are required to take quick remedial action. A sample of analyte aerosol in air may be captured using suitable means such as a filter designed to capture respirable particles, sampling bag, and other similar enclosures. The particles may also derive from a liquid sample obtained from a wet-wall cyclone or similar device that has been subsequently re-aerosolized. An example of a wet-wall cyclone is the SpinCon II (Innovaprep, Drexel, MO). The particles in these aerosols could include, but are not limited to anthrax, Ebola virus, ricin, and botulinum toxin. All of these collection methods require additional processing to extract biological particles for analysis, resulting in delays of hours or days to detect and identify a hazardous aerosol.

The aerosol particles to be analyzed need not be limited to particles found in ambient air. Analyte aerosol could include exhaled breath particles (EBP) found in exhaled air of humans or animals. The volume of air exhaled during breathing in healthy adults is typically between 1-2 liters, which includes a normal tidal volume of about 0.5 liters. Humans produce exhaled breath particles (EBPs) during various breath activities, such as normal breathing, coughing, talking, and sneezing. EBP concentrations from mechanically ventilated patients during normal breathing may be about 0.4 to about 2000 particles/breath or 0.001 to 5 particles/mL [1]. In addition, the size of the EBP's may be below 5 micrometers, and 80% of them may range from 0.3 to 1.0 micrometers. Exhaled particle size distribution has also been reported to fall between 0.3 and 2.0 micrometers. The mean particle sizes of EBPs may be less than 1 micrometer during normal breathing, and 1 to 125 micrometers during coughing. Further, 25% of patients with pulmonary tuberculosis exhaled 3 to about 600 CFU (colony forming unit) of *Mycobacterium tuberculosis* when coughing, and levels of this pathogen primarily ranged 0.6 to 3.3 micrometers. These bacteria are rod shaped and are about 2 to 4 micrometers in length and about 0.2 to 0.5 micrometers in width.

Solutions to detect and analyze aerosol analytes, such as biological agents are available but do not permit real-time analysis. One solution employs microfluidic techniques to clean-up the sample and concentrate the biological analyte. For example, specific antibodies may be employed to concentrate and purify the biological analyte. This target-specific solution provides reasonable results if sufficient time is allowed for clean-up and concentration of the analyte. Another solution is target specific and works only for bacterial analytes at the expense of analyzing viruses, toxins, or particulate chemicals. This method requires a sample, for example from a patient, to be applied to a bacterial culture plate and incubated for 8 to 24 hours. After the bacterial colonies have grown, individual amplified and purified colonies are collected and measured by whole cell MALDI TOF mass spectrometry. Numerous studies have examined the accuracy of this technique and have found >99% accurate identification for clinical bacterial analytes. Two commercial systems for rapid clinical bacterial identification have been developed, namely, the Bruker Biotyper (marketed by Becton Dickinson) and the Shimadzu Vitek MS (marketed by bioMérieux). These systems provide excellent diagnostic results relative to the 16s RNA "gold standard." However, to achieve these high-confidence clinical results, either a culturing or an extraction step, or both is needed to purify the sample. Therefore, the time from sampling to identification of the bio analyte is generally twelve hours to a day or more. While such delays are often tolerable in clinical laboratories, they are often unacceptable for other applications such as biodefense, where real-time identification of bio analytes is needed. Biodefense, as well as point-of-care healthcare applications, requires the ability to simultaneously identify in real-time not only bacteria, but also fungi, viruses and large bioorganic molecules (e.g. proteins, peptides and lipids) including biotoxins. Further, decreasing analysis time for clinical applications could improve quality of care and outcomes by enabling more timely treatment and identification of the best course of treatment (for example distinguishing between viral and bacterial infection) and evaluation of the effectiveness of the course of treatment.

Real-time aerosol particle detection has many commercial uses also. For example, the head space in a fermenter could be analyzed for possible contaminants. It is often desired to know the speciation of microbes in the air within a food or healthcare facility. The analyte particles could comprise of microbes such as viruses, bacteria, algae or fungi. The analyte particles could also comprise of a mixture of microbes and proteins and peptides.

Methods and devices for providing rapid (or real-time) analysis and identification of aerosol analyte particles including bacteria, fungi, viruses, and toxins with high accuracy and without pretreating the particles with complex organic MALDI matrices are desired.

BRIEF DISCLOSURE

Disclosed herein are methods and devices that use mass spectrometry and one or more optical detection methods to yield high accuracy identification of aerosol analyte particles in real-time or close to real-time. Further, the present disclosure relates to methods and devices for identifying biological aerosol analytes that use at least one of time of flight mass spectrometry (TOF-MS), optical single particle sensors and a data analysis system capable of data fusion of data generated from the one or more sensors and real-time identification of analyte particles using machine learning tools.

Disclosed is an exemplary method for identifying bio-aerosol particles without using complex organic MALDI-matrices, which may generating an aerosol particle beam using an aerosol beam generator, indexing each particle in the beam using a first laser, detecting the position of each indexed particle using a continuous timing laser, triggering an ionization pulse laser to simultaneously generate an IR laser pulse and an UV laser pulse when each indexed particle reaches the ionization region of the ionization laser, generating ionized fragments of each indexed particle and photons associated with each indexed particle wherein the molecular weight of each ionized fragment is between about 1 kDa and about 150 kDa, analyzing at least one ionized fragment of each indexed particle and photons associated with each indexed particle using at least one detector, generating unique spectral data associated with each indexed particle from each detector, compiling the unique spectral data using data fusion to generate compiled spectral data and determining the composition of each particle. At least one property of the indexed particle including at least one of particle size, particle shape, and fluorescence may be measured using at least one of the first laser and the timing laser. The ionization laser may be triggered using at least one of the first laser and the timing laser when at least one property of the indexed particle meets a predetermined threshold value for that property. The composition of each particle may be determined by comparing the compiled spectral data with a training data set knowledge base of biological matter spectra to predict composition, updating the training data set knowledge base, and using machine learning methods to improve the prediction of composition over time. The machine learning methods may comprise supervised machine learning methods. The composition of each particle may also be determined using unsupervised machine learning methods to classify un-labeled aerosol particles and identify of anomalous aerosol particles. Unsupervised machine learning methods may comprise weighted principal composition analysis (PCA). Unlabeled aerosol particles may be identified and the presence of anomalous particles (e.g., the presence of biological threat agents in air) may be flagged to enable taking of corrective remedial measures. The IR laser pulse may be characterized by wavelength of between about 1.0 micrometer and about 1.2 micrometer. The UV laser pulse may be characterized by wavelength of between about 250 nm and about 400 nm. The wavelength of the IR pulse may be about 1.06 micrometer. The wavelength of the UV pulse may be about 355 nm. The IR laser power density may be between about 1 $MW/cm^2$ and about 20 $MW/cm^2$. The IR laser pulse width may be between about 1 ns and about 10 ns. The IR laser pulse repetition rate may be about 1 kHz. The detector may comprise at least one of a TOF-MS detector, fluorescence detector, LIBS detector, and a Raman spectrometer. The ionized fragments may comprise UV chromophores including at least one of dipicolinic acid, tryptophan, tyrosine, phenylalanine. The IR laser pulse and UV laser pulse may be generated using a Nd:YAG laser.

Disclosed is an exemplary method for identifying bio-aerosol particles comprising IR chromophores without using complex organic MALDI-matrices comprising generating an aerosol particle beam using an aerosol beam generator, indexing each particle in the beam using a first laser, detecting the position of each indexed particle using a continuous timing laser, triggering an ionization pulse laser using the timing laser to generate an IR laser pulse when each indexed particle reaches the ionization region of the ionization laser, generating ionized fragments of each indexed particle and photons associated with each indexed particle wherein the molecular weight of each ionized fragment is between about 1 kDa and about 150 kD, analyzing at least one ionized fragment of each indexed particle and photons associated with each indexed particle using at least one detector, generating unique spectral data associated with each indexed particle from each detector, compiling the unique spectral data using data fusion to generate compiled spectral data and determining the composition of each particle. At least one property of the indexed particle including at least one of particle size, particle shape, and fluorescence may be measured using at least one of the first laser and the timing laser. The ionization laser may be triggered using at least one of the first laser and the timing laser when at least one property of the indexed particle meets a predetermined threshold value for that property. The IR chromophores may comprise at least one of water, agar, and carbohydrates. The composition of each particle may be determined by comparing the compiled spectral data with a training data set knowledge base of biological matter spectra to predict composition, updating the training data set knowledge base, and using machine learning methods to improve the prediction of composition over time. The machine learning methods may comprise supervised machine learning methods. The composition of each particle may also be determined using unsupervised machine learning methods to classify un-labeled aerosol particles and identify of anomalous aerosol particles. Unsupervised machine learning methods may comprise weighted principal composition analysis (PCA). Unlabeled aerosol particles may be identified and the presence of anomalous particles (e.g., the presence of biological threat agents in air) may be flagged to enable taking of corrective remedial measures. The travel time of each particle from the aerosol beam generator to the ionization region of the ionization pulse laser is typically less than about 1 s. The IR laser pulse may be characterized by wavelength of between about 2.7 micrometer and about 3.3 micrometer. The wavelength of the IR pulse may be about 2.94 micrometer. The IR laser power density may be between about 1 $MW/cm^2$ and about 20 $MW/cm^2$. The IR laser pulse width may be between about 40 microsecond and about 100 microsecond. The IR laser pulse repetition rate may be about 1 kHz. The detector may comprise at least one of a TOF-MS detector, fluorescence detector, LIBS detector, and a Raman spectrometer. The IR laser pulse and UV laser pulse may be generated using least one of an Er:YAG laser and a OPO laser.

Disclosed is an exemplary system for identifying bioaerosol particles without using complex organic MALDI-matrices comprising an aerosol beam generator to generate a beam of single particles, a continuous timing laser generator to generate a laser beam to index each particle in the aerosol beam, a pulse ionization laser generator triggered by the continuous timing laser if predetermined conditions are met and configured to generate at least one of an IR laser pulse and a UV laser pulse to produce at least one of ionized fragments of each indexed particle and photons associated with each indexed particle, and at least one detector to analyze at least one ionized fragment and photons associated with each particle and generate unique spectral data associated with each indexed particle from each detector. The system may further comprise a data analysis system to compile the unique spectral data associated with each particle using data fusion to generate compiled spectral data. The system may further comprise a machine learning engine in data communication with the data analysis system. The pulse ionization laser power density is between about 1 $MW/cm^2$ and about 20 $MW/cm^2$. At least one property of the indexed particle including at least one of particle size, particle shape, and fluorescence may be measured using the timing laser. The ionization laser may be triggered using the timing laser when at least one property of the indexed particle meets a predetermined threshold value for that property. More than one continuous timing laser generator may be used to perform at least one of the functions of indexing each particle in the aerosol beam, triggering the pulse ionization laser generator and measuring at least one property of each indexed particle. The at least one detector comprises may comprise at least one of a TOF-MS detector, fluorescence detector, LIBS detector, and a Raman spectrometer.

Other features and advantages of the present disclosure will be set forth, in part, in the descriptions which follow and the accompanying drawings, wherein the preferred aspects of the present disclosure are described and shown, and in part, will become apparent to those skilled in the art upon examination of the following detailed description taken in conjunction with the accompanying drawings or may be learned by practice of the present disclosure. The advantages of the present disclosure may be realized and attained by means of the instrumentalities and combinations particularly pointed out in the appendant claims.

DRAWINGS

The foregoing aspects and many of the attendant advantages of this disclosure will become more readily appreciated as the same becomes better understood by reference to the following detailed description, when taken in conjunction with the accompanying drawings, wherein:

FIG. 1. Schematic diagram of an exemplary system for single particle aerosol analysis.

FIG. 2. Schematic diagram of an exemplary method for single particle aerosol analysis using simultaneous dual wavelength (IR and UV) particle absorption to create large informative biological ions.

FIG. 3. Schematic diagram of an exemplary method for single particle aerosol analysis using hydroxyl group IR absorption as an intrinsic infrared MALDI matrix to create large informative ions.

FIG. 4. Schematic workflow of identification of TB biomarkers using machine learning methods.

FIG. 5. Weighted principal component analysis (PCA) of signals acquired from positive and negative ion modes of TB and non-TB samples.

FIG. 6. Significance Analysis of Microarrays (SAM)-based feature selection with extracted signals from negative ions of TB and non-TB samples.

FIG. 7. Support Vector Machine (SVM) analysis for optimal feature selection in positive and negative ion modes of TB and non-TB samples.

All reference numerals, designators and callouts in the figures are hereby incorporated by this reference as if fully set forth herein. The failure to number an element in a figure is not intended to waive any rights. Unnumbered references may also be identified by alpha characters in the figures and appendices.

The following detailed description includes references to the accompanying drawings, which form a part of the detailed description. The drawings show, by way of illustration, specific embodiments in which the disclosed systems and methods may be practiced. These embodiments, which are to be understood as "examples" or "options," are described in enough detail to enable those skilled in the art to practice the present invention. The embodiments may be combined, other embodiments may be utilized, or structural or logical changes may be made, without departing from the scope of the invention. The following detailed description is, therefore, not to be taken in a limiting sense and the scope of the invention is defined by the appended claims and their legal equivalents.

In this disclosure, aerosol generally means a suspension of particles dispersed in air or gas. "Real-time" analysis of aerosols generally means analytical methods and devices that identify the aerosol analyte within a matter of minutes after the aerosol sample to be analyzed is introduced to the analytical device or system. The terms "a" or "an" are used to include one or more than one, and the term "or" is used to refer to a nonexclusive "or" unless otherwise indicated. In addition, it is to be understood that the phraseology or terminology employed herein, and not otherwise defined, is for the purpose of description only and not of limitation. Unless otherwise specified in this disclosure, for construing the scope of the term "about," the error bounds associated with the values (dimensions, operating conditions etc.) disclosed is ±10% of the values indicated in this disclosure. The error bounds associated with the values disclosed as percentages is ±1% of the percentages indicated. The word "substantially" used before a specific word includes the meanings "considerable in extent to that which is specified," and "largely but not wholly that which is specified."

DETAILED DISCLOSURE

Particular aspects of the invention are described below in considerable detail for the purpose for illustrating the compositions, and principles, and operations of the disclosed methods and systems. However, various modifications may be made, and the scope of the invention is not limited to the exemplary aspects described.

In exemplary system 100 (FIG. 1), aerosol particles, for example, particles comprising biological matter in air are routed to a suitable inlet element 101 that removes debris and materials from the particles, at rates of 1000's of particles per second, and flow into an aerosol beam generator 102 that collimates the particles into a narrow beam of single particles. The beam generator utilizes differential pumping to reduce the pressure to a level that is compatible with the high vacuum in chamber 104. The particles may be indexed using a continuous laser from laser generator 103 (e.g. commercially available laser scattering devices that include but are not limited to, MAC and Polaran systems). In addition, the continuous laser may be used to determine particle size, fluorescence (autofluorescence) and polarization (particle shape) and identify particles of particular interest. The particles then travel into a vacuum chamber 104 through a series of focusing lenses. This chamber may house an advanced time-of-flight mass spectrometer (TOF-MS) 106 and optionally, light collection optical components 107. As each indexed particle enters the center of the chamber 104, it is struck with a high-power laser pulse from a laser generator 108. Aerosol mass spectrometry requires the ionization laser 108 to fire when the aerosol particle enters the region illuminated by the laser (typically <150 microns in diameter). Because the ionization laser 108 fires a pulse that is less than 5 ns (nanosecond) in duration, advanced knowledge is required to predict when a particle will enter the ionization region and trigger the laser 108. Multiple lasers may be used to measure and track particles to predict the time at which a particle will enter the view of the laser. In the exemplary system, at least one of the laser from generator 103 and the laser from laser generator 112 may be used to index and detect particles as they leave the beam generator 102. Because both laser beams 108 and 112 are closely aligned, a single trigger laser 112 is sufficient to predict the path of a single aerosol particle and trigger the ionization laser 108, greatly reducing the complexity of the particle timing hardware. Laser 108 may also be triggered using the laser from generator 103. Laser 108 may be triggered only when at least one of particle size, shape, and fluorescence meets or exceeds a predetermined threshold value for that property. When monitoring the composition of aerosol particles in ambient air at periodic intervals, the selective triggering of laser 108 in this manner, and subsequent examination of ionized fragments of each particles and analysis of the data collected may be controlled (or tuned) to avoid collection of superfluous data and improve data management. The timing (or trigger) laser 112 may also be used to measure optical properties of the particle (size, shape and fluorescence). These measurements can be used to select particles to be ionized, and data can be combined with mass spectral measurements and other optical information obtained during ionization for analysis in data analysis system 110 using data fusion methods. The intensity of laser pulse from generator 108 may be tuned such that the particle is deconstructed to generate ions from the constituent biochemical components. That is, the laser vaporizes and ionizes at least some of the analyte molecules, thus generating ions with specific mass to charge ratios (m/z). These large, informative ions are accelerated into the TOF-MS 106 where they are analyzed. Further, when the analyte particles absorb sufficient light energy from a laser beam, they emit characteristic photons as they transition from a high-energy state to a lower energy state. Light emissions could also be associated with transitions between vibrational states. The interaction of the high-power laser pulse generated by generator 108 with the particles may also induce transient optical signatures such as high-order fluorescence, laser-induced breakdown spectroscopy (LIBS), Raman spectra and infrared spectra. Chamber 104 may also comprise light collection optical components 107. Unique spectral data associated with each particle and generated using the TOF-MS and optical sensors 109, and particle specific data (e.g., particle size, shape, fluorescence) from laser devices 103 and 112 may undergo data processing including data fusion in data analysis system 110 to generate compiled spectral data associated with each particle. The compiled spectral data may be compared with a training data set comprising of a knowledge base of known biological matter spectra to predict composition. System 110 may be in data communication with machine learning engine 111 to allow for updating the training data set knowledge based and improving the prediction of composition over time. The pressure in chamber 104 is reduced to at least $10^{-5}$ torr using vacuum pump 105. In exemplary system 100, the travel time (or residence time) of a particle from beam generator 102 to being hit with laser 108 is less than about 1 s.

In an exemplary method 200 (FIG. 2), individual aerosol particles 201 in an aerosol beam or stream may be simultaneously exposed in step 202 to an infrared (IR) laser pulse of wavelength between about 1.0 micrometer and about 1.2 micrometer, and a UV laser pulse of between about 250 nm and about 400 nm in wavelength. The advantage of analyzing bioaerosol particles one particle at a time is that each particle is a representative of the "pure sample" of the constituent proteins and other high molecular weight molecules in the particle. In the case of a single airborne bacterium, it represents a "pure culture" of that one organism. The wavelength of the IR laser pulse and UV laser plus may be about 1.06 micrometer and about 355 nm, respectively. For example, a frequency tripled (or quadrupled) Nd:YAG laser may be modified to produce an IR laser pulse with wavelength between about 1.0 micrometer and about 1.2 micrometer and a UV laser pulse with wavelength between about 250 nm and about 400 nm. Rapid heating of aerosol particles when exposed to the IR pulse may efficiently "pop-open" or burst each particle instantaneously and generate a host of molecules 203 (ionized small and large fragments) that are characteristic of each particle. At high IR laser power densities between about 20 $MW/cm^2$ and about 150 $MW/cm^2$, pyrolysis creates small ions of molecular weight below about 1 kDa and typically below 500 Da (hard ionization), reducing the information content in the resulting spectra. Reducing the IR laser power density to between about 1 $MW/cm^2$ and about 20 $MW/cm^2$ (soft ionization) may reduce the pyrolysis effect and produce large biomolecule fragments from the aerosol particles. IR laser repetition rate (pulse frequency or number of pulses per second) is typically in the 1 kHz range and pulse width (duration of the IR pulse) is between about 1 nanosecond (ns) and about 10 ns. However, ionizing these exposed biomolecules using only an IR laser pulse has not been effective. The UV pulse interacts with intrinsic UV chromophores in the particles (part of the molecule that absorbs UV light) to create large biological ions with specific mass to charge (m/z) ratios for mass spectrometer analysis without the need to add complex organic matrix assisted laser desorption/ionization (MALDI) matrices. The MALDI process requires a sample processing step whereby another chemical (in a solvent) coats the sample before it is analyzed in the TOF MS. Method 200 obviates the need for this complex sample processing step, while still producing large informative ions particularly in the case of biological aerosol particles. These ions may be analyzed using a high mass range TOF-MS in step 204 capable of analyzing ions with molecular weight between about 1 kDa and about 150 kDa. The resulting spectra, when analyzed with data fusion and machine learning methods improves the accuracy, sensitivity and specificity related to the identification of the analyte particle. Method 200 may be particularly suited when the analyte aerosol comprises of UV chromophores that include, but are not limited to, molecules such as dipicolinic acid (e.g., as found in in bacterial spore coats), amino acids containing phenyl groups (e.g., tryptophan, tyrosine, and phenylalanine) and many exogenous compounds in growth media that have the tendency to absorb ultraviolet light. Exemplary system 100 may be used to implement method 200.

Aerosol analyte particles collected from ambient air typically contains a significant amount of water. There is strong association of water with background atmospheric particles and particularly for particles containing biological macromolecules such as proteins and DNA. In a bacterial cell, lipopolysaccharide, peptidoglycan and glycan may make up for only about 10% of the dry weight of the vegetative cell. Further, many other compounds associated with biological particles contain large amounts of hydroxyl groups that will have the same strong laser interactions as water. Water (ambient humidity/moisture) associated with every particle sampled from the atmosphere may potentially be used as a laser absorbing matrix for single particle TOF-MS. The ubiquitous presence of water in atmospheric aerosol particles provides a mechanism for ion generation across a broad spectrum of masses. As previously described, in exemplary system 100, the travel time (or residence time) of a particle from beam generator 102 to being hit with laser 108 is less than about 1 s. This short residence time permits the analysis of IR chromophores in exemplary method 300. As a result of this short transit time, water that is already strongly bound to the surface of the particles 301 as a thin film (e.g., monolayer film) or contained within the particles as water or hydroxyl groups, does not evaporate but is available for strong interaction with IR laser pulses in step 302. Biological matter usually contains molecules in high concentrations that contain infrared-active hydroxyl groups. In fact, every cellular interaction in the body involves specific interactions between carbohydrate molecules that decorate the surface and exist throughout cellular material. Furthermore, normal preparations of biological materials are often contaminated with growth media such as agar. These materials (IR chromophores) strongly absorb IR radiation because of their high content of hydroxyl groups. The IR laser pulse may have a wavelength between about 2.7 micrometer and about 3.3 micrometer. The wavelength of the IR pulse may be about 2.94 micrometers. IR laser repetition rate is typically in the 1 kHz range and pulse width may be between about 40 microsecond and about 100 microsecond. The IR laser power density may be between about 1 $MW/cm^2$ and about 20 $MW/cm^2$. The overlap between the infrared absorption of hydroxyl containing molecules such as water, carbohydrate and Agar, and the IR laser line is also shown FIG. 3. The IR laser pulses may be generated using Er:YAG laser modules sold by Pantec Biosolutions AG (Rugell, Liechtenstein). Optical Parametric Oscillators (OPO) may also be used. The strong interaction between the laser pulse and the particles generates ions 303 across a broad range of masses. These ions may be measured using a high mass range TOF-MS in step 304 that is capable of analyzing ions with molecular weight between about 1 kDa and about 150 kDa. The natural association of small amounts of strongly bound surface water and water molecules contained within the particles, coupled with the short residence times in vacuum, presents the opportunity to generate large molecular fragments (1 kDA to 150 kDa molecular weight) and highly informative mass spectra without requiring any other MALDI chemical reagents. Method 300 therefore enables rapid detection of aerosol particles with high (>80%) accuracy, sensitivity and specificity. Method 300 eliminates the need for freezing the particle using liquid nitrogen or other means to freeze surface water and use the thin film of frozen water as the matrix for MALDI TOF-MS. It also eliminates the need for more complex methods that employ a water droplet generator (about 50 microns in diameter) to create water droplets that are then introduced into the vacuum chamber of a TOF-MS or the use of an acoustic levitator for generating water or solvent (e.g., 50 vol.-% methanol in water solution) droplets that are about 2 mm in diameter to yield soft evaporation/ionization [3]. Generation of large molecular fragments may also be improved by treating the aerosol particles using a spray of water or solvent-water mixture before ionization using the IR laser pulse. Organic solvents comprising at least one of methanol, ethanol, and isopropanol may be used.

In the event that aerosol particles comprise of non-biological particles and identifying the chemical composition of the particles is desired, analysis of these particles may be done by hard ionization to generate small ions. An IR laser pulse with laser power densities between about 20 $MW/cm^2$ and about 150 $MW/cm^2$ may be used for this purpose. Methods 200 and 300 may be modified to enable switching between hard ionization that generates fragments of molecular weight less than 1 kDa, and typically less than 500 Da, and soft ionization that generates fragments of molecular weight typically greater than 1 kDa.

In the exemplary methods described above, each individual aerosol analyte particle is indexed prior to ionization and tracked using at least one continuous laser. Further a continuous laser may be used to measure particle properties such as size and shape. Each individual particle is indexed and tracked to enable data fusion of mass spectral data associated with each particle and the optical properties of each particle. These optical properties may include size, shape and polarization of the particles. Indexing allows mass spectral data collected after ionization of each particle to be associated with each particle. The large amount of data related to each particle in the aerosol beam may then be filtered and analyzed using data fusion protocols in data analysis system 110 to identify the composition and type of particles in real-time and with a high accuracy, sensitivity, and specificity. Data fusion may be defined as a combination of data from multiple sources to obtain improved information in terms of less expensive, higher quality, or more relevant information. A review of data fusion techniques is provided by Castanedo [2], which is incorporated by reference herein in its entirety.

In exemplary methods 200 and 300, in addition to TOF-MS mass spectral analysis, one or more optical detection methods may also be employed because when the analyte aerosol particles absorb sufficient light energy from a laser pulse, they emit characteristic photons as they transition from a high-energy state to a lower energy state and generate transient optical signatures such as high-order fluorescence, laser-induced breakdown spectroscopy (LIB S), Raman spectra and infrared spectra. Therefore, in additional to mass spectrometry, optical sensors/detectors 109 may be used to identify the composition of the aerosol particles. Measured data collected using both TOF-MS and optical sensors may be processed using data fusion techniques to provide information on the composition of the aerosol analytes. By collecting information from a variety of detectors that include one or more optical methods and mass spectrometry, it is possible to filter and analyze the data associated with each particles using data fusion protocols to rapidly (close to real-time) identify the composition and type of particles with a high accuracy, sensitivity, and specificity. For each indexed individual aerosol particle, data from each of the measurements comprising at least one of TOF-MS, LIBS, Raman spectroscopy and infrared spectroscopy, may be transferred to the sensor data fusion engine 108 where artificial intelligence tools including machine learning and deep learning may be employed to fully characterize the particles.

In LIBS, a laser pulse (e.g. from a high energy Nd:YAG laser with a wavelength of about 1064 nm) is focused on the particle to ablate a small amount of the particle to generate a plasma. The analyte particle breakdown (dissociate) into ionic and atomic species. When the plasma cools, characteristic atomic emission lines of the elements may be observed using an optical detector such as a CCD detector. Another exemplary optical detection tool is Raman spectroscopy. Raman spectroscopy provides information about molecular vibrations that can be used for sample identification and quantitation. The technique involves focusing a laser beam (e.g. a UV laser source with wavelength between about 330 and about 360 nm) on a sample and detecting inelastic scattered light. The majority of the scattered light is of the same frequency as the excitation source and is known as Rayleigh or elastic scattering. A very small amount of the scattered light is shifted in energy from the laser frequency, due to interactions between the incident electromagnetic waves and the vibrational energy levels of the molecules in the sample. Plotting the intensity of this "shifted" light versus frequency results in a Raman spectrum of the sample. In fluorescence spectroscopy, the analyte molecules are excited by irradiation at a certain wavelength and emit radiation of a different wavelength. The emission spectrum provides information for both qualitative and quantitative analysis. When light of an appropriate wavelength is absorbed by a molecule, the electronic state of the molecule changes from the ground state to one of many vibrational levels in one of the excited electronic states. Once the molecule is in this excited state, relaxation can occur via several processes. Fluorescence is one of these processes and results in the emission of light. By analyzing the different frequencies of light emitted in fluorescent spectroscopy, along with their relative intensities, the chemical structure associated with different vibrational levels can be determined. Certain amino acids in biological samples, for example tryptophan, have high fluorescent quantum efficiencies, which favors the use of fluorescent spectroscopy for identifying these amino acids.

Machine learning (ML) techniques for analyzing collected spectral data obtained using machine learning engine 111 offers a significant improvement to manual data processing for analyte identification, which is slow and labor intensive. Machine learning is generally a subset of artificial intelligence and comprise algorithms whose performance improve with data analysis over time. Supervised machine learning methods may be used. Supervised learning comprises the task of learning a function that maps an input to an output based on example input-output pairs. It infers a function from labeled training data consisting of a set of training examples. Machine learning also includes deep learning methodologies which are unsupervised learning methods that can identify signatures in complex data sets without the need to a priori identify specific features. Unsupervised machine learning methods and semi-supervised (hybrid methods between supervised and unsupervised learning) may also be used. Unsupervised learning methods may comprise a type learning that helps find previously unknown patterns in data set without pre-existing labels. Two exemplary methods used in unsupervised learning are principal component and cluster analysis. Cluster analysis is used in unsupervised learning to group, or segment, datasets with shared attributes in order to extrapolate algorithmic relationships. Cluster analysis is a branch of machine learning that groups the data that has not been labelled, classified or categorized. Cluster analysis identifies commonalities in the data and reacts based on the presence or absence of such commonalities in each new piece of data. This approach helps detect anomalous data points. Unsupervised learning methods may be used for anomaly detection, which can be helpful in identifying previously unknown hazards. For example, air samples may be analyzed at periodic intervals to measure the composition of particles in air and to identify the properties of the particles (e.g., size, shape, fluorescence) and spectra associated with particles to get a baseline data information of particles in "normal" ambient air. Particles in ambient air after an event such as the release of biological threat agents into the atmosphere would provide particle property data and spectral data that deviate from baseline data and would highlight an anomaly (as evidenced by anomalous spectra) and provide an opportunity to take necessary remedial steps to mitigate the threat. As previously described, the compiled spectral data may be compared with a training data set comprising of a knowledge base of known biological matter spectra to predict particle composition. System 110 may be in data communication with machine learning engine 111 to allow for updating the training data set knowledge based and improving the prediction of composition over time. Biological matter mass spectra cover a range that is about three orders of magnitude greater than chemical mass spectra, significantly complicating the application of automated techniques.

Figure 1:
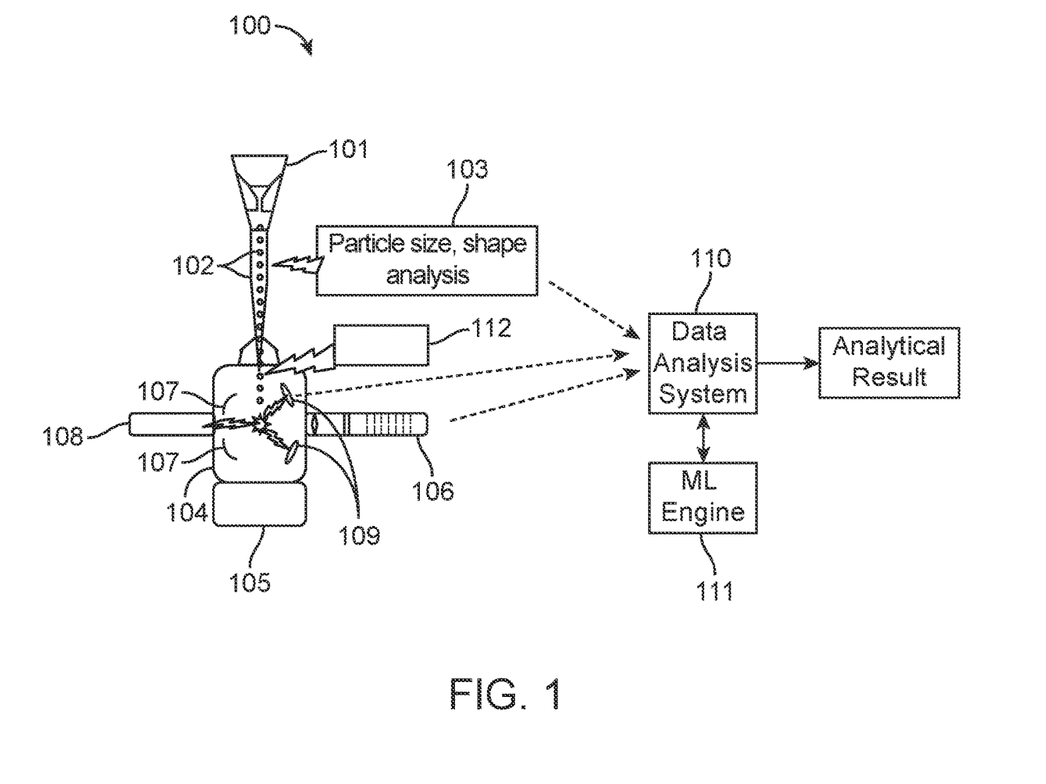
Figure 2:
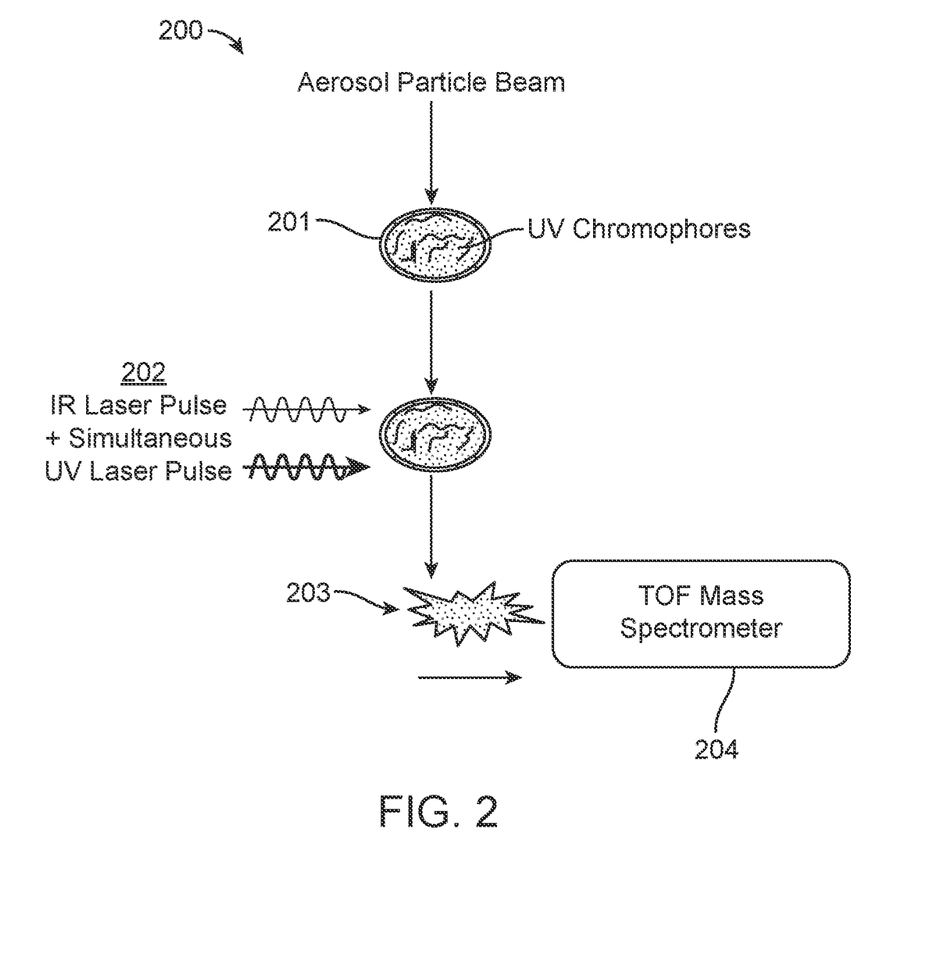
Figure 3:
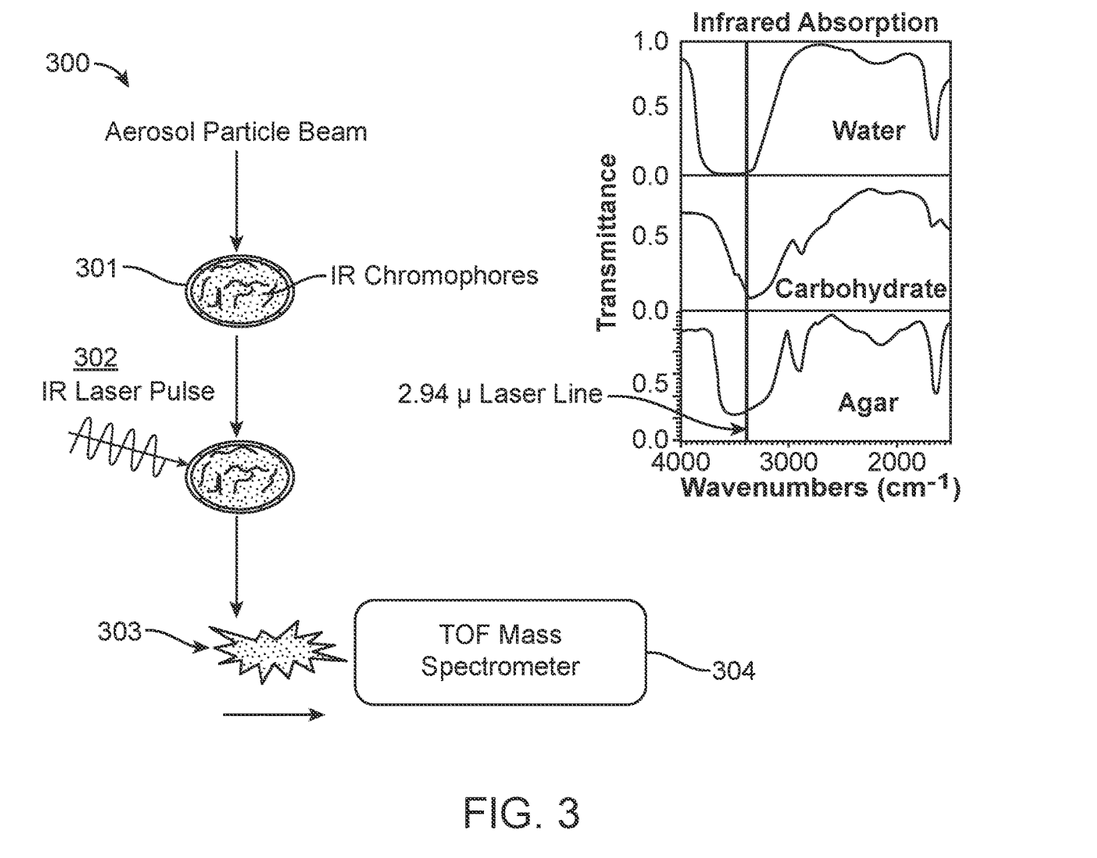
Figure 4:
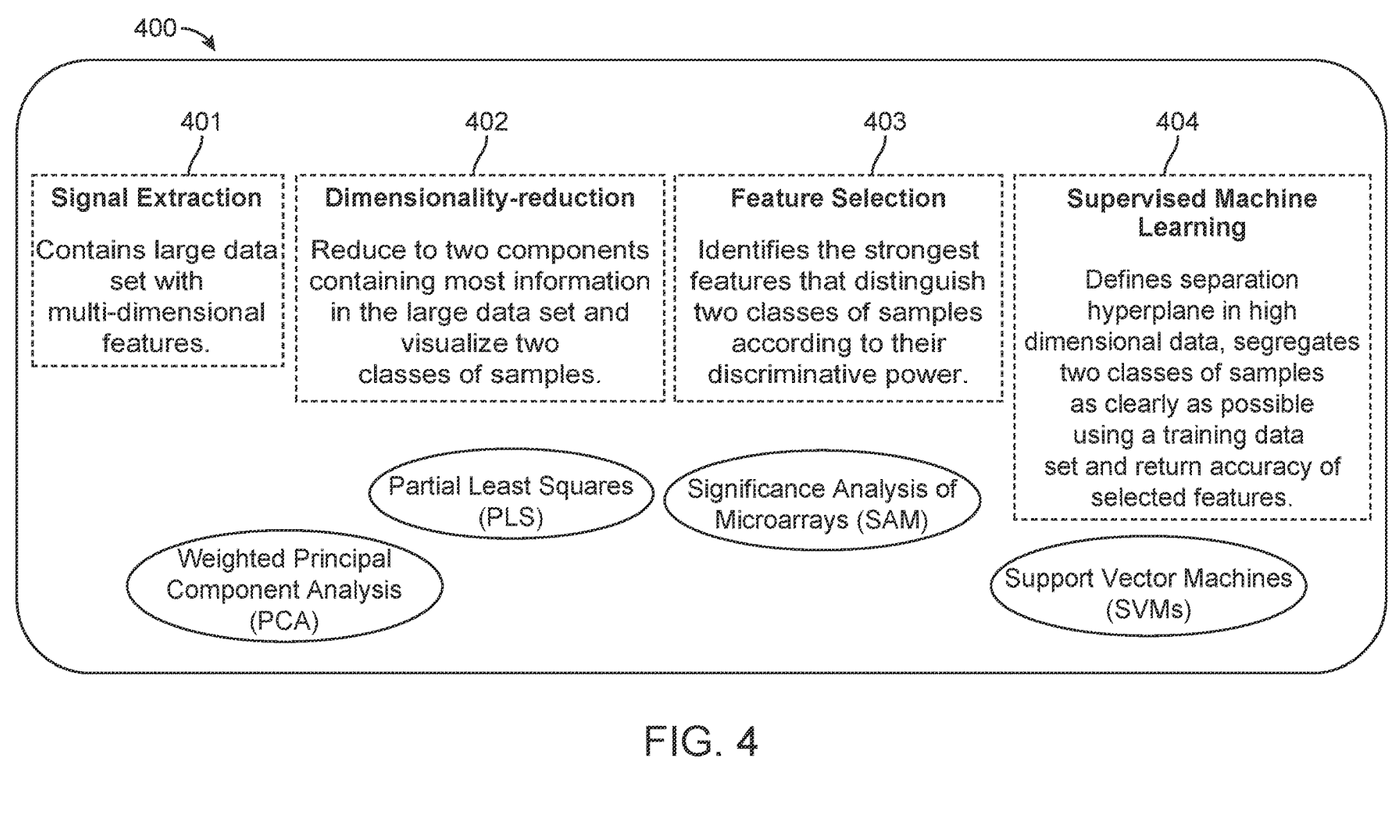
Figure 5:
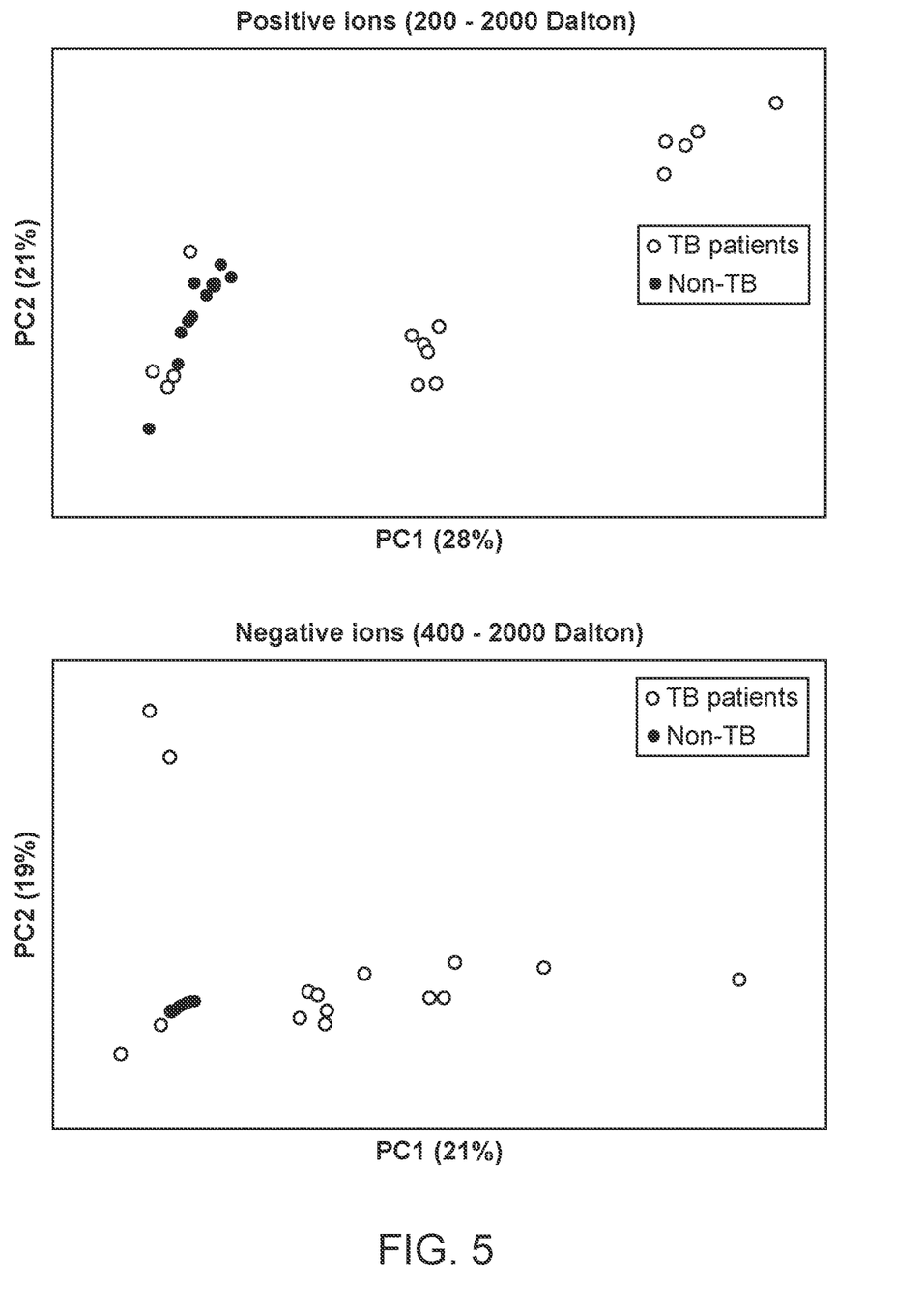

In addition, environmental contaminants can reduce signal strength by competing with the target during the ionization process (competitive ionization), a introduce signature components (clutter) that must be deconvolved with the target signature. Current automated methods are mostly limited to searching for very pure targets in samples with no environmental clutter. The disclosed exemplary methods eliminate competitive ionization by physically separating target analyte from clutter and eliminates ambiguities in the signature (each event is assumed to be an either target or clutter). An exemplary ML schematic diagram 400 for identifying tuberculosis (TB) biomarkers using high-resolution mass spectrometry is shown in FIG. 4 and may be applied to methods 200 and 300. Positive and negative ion signals containing 1000s of features were obtained (or extracted) using a high resolution Orbitrap mass spectrometer (ThermoFisher Scientific) in step 401. Masses above a 5:1 signal to noise ratio (SNR) were selected. Weighted principal components analysis (PCA), an unsupervised dimensionality-reduction algorithm, was used in step 402 to reduce the large set of signals to two components. PCA provided 2-D visualization, which was used to explore whether extracted signals would reveal intrinsic differences between two classes of samples, TB and non-TB. FIG. 5 shows the output of PCA of signals extracted in positive and negative ion modes from 19 sputum-positive TB patients and 17 Non-TB subjects. Positive and negative ion signals were collected from two groups of samples, namely non-TB subjects and TB patients. PCA results revealed that the samples of each group were prone to cluster together, suggesting extracted signals collected from high-resolution mass spectrometry could be used to distinguish the two classes of samples. Step 402 may also be employed to analyze data collected from methods 200 and 300 using TOF-MS.

In method 400, Significance Analysis of Microarrays (SAM) SAM techniques were also applied in step 403 to the extracted signals in step 401 to identify strongly discriminative features, and to select the most powerful features to distinguish the two classes of samples. SAM is a feature selection algorithm that is designed to process a big data set and identify the strongest features between two classes of samples. SAM analysis returned a feature ranking list based on their quantity-changes, statistical significance, and false positive rates. Features identified by SAM were optimized using Support Vector Machines (SVMs) in step 404. SVMs are a supervised machine learning-based classifier that uses a training dataset to define separation hyperplane in a fashion that an unknown sample can be classified depending on the side of separation hyperplane. The advantage of SVMs depends on their ability to process high dimensional data and predict analyte composition and continuously improve the knowledge-base contained in the training data set.

Figure 6:
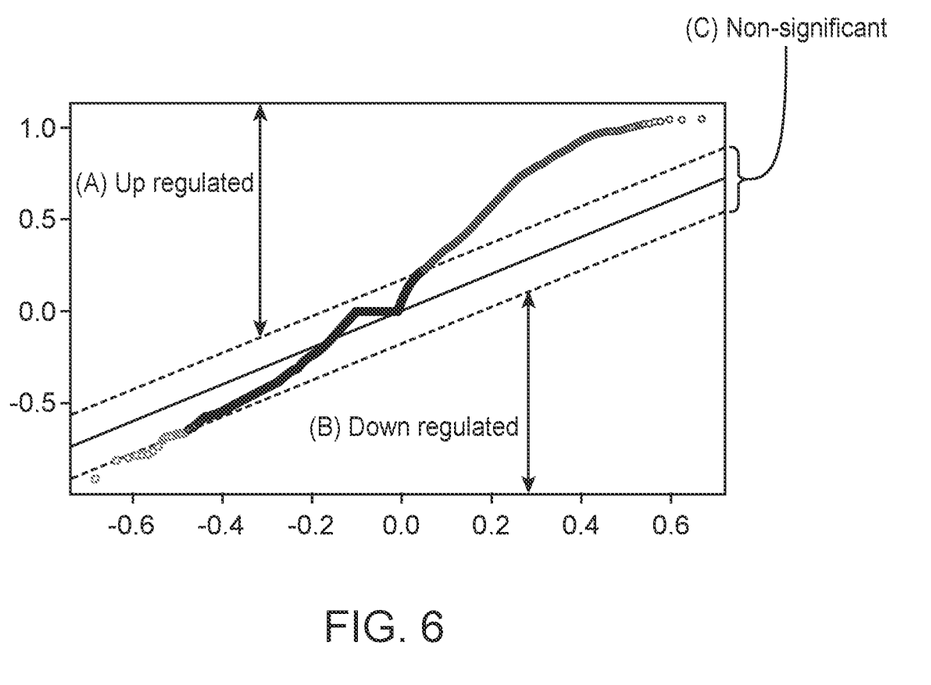
Figure 7:
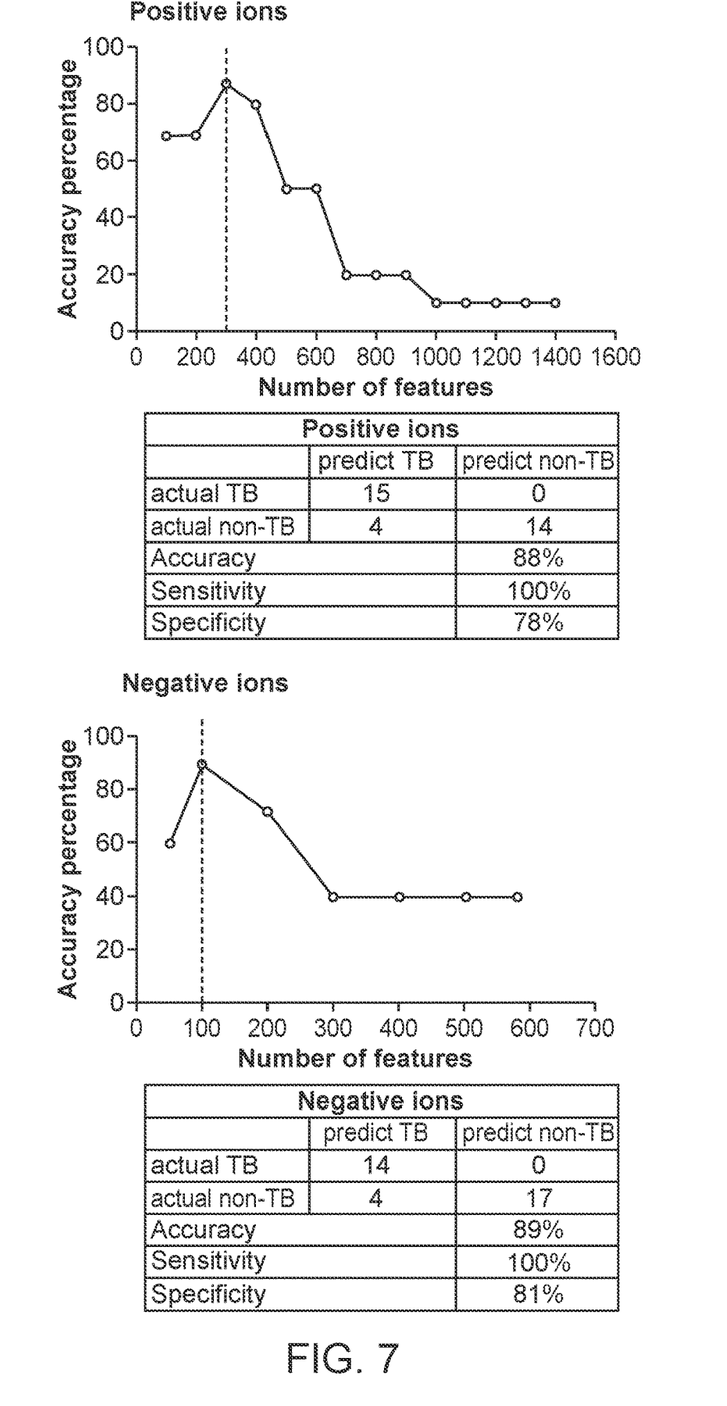

As an example, SAM-based feature selection with extracted signals from negative ions is shown in FIG. 6. The data comprises features that fall into three classes, (A) up-regulated, (B) down-regulated and (C) non-significant. Signals that are higher in TB patients than Non-TB subjects (up-regulated) are represented by region A, and region B represents lower signals in TB patients (down-regulated). Overall, greater than 1500 features (ion signals) extracted from positive ion mode and greater than 500 features extracted from negative ion mode were found to be higher in TB patients. SVM analysis was then carried out to optimize the number of features. In this analysis, thousands of signals compared with a relatively small number of subjects (training data set) demonstrated the feasibility of identifying TB-relevant signals. As a classifier algorithm, SVMs may be used to optimize those selected features by SAM, by returning a confusion matrix, using which the percentages of accuracy, sensitivity, and specificity were calculated. As shown in FIG. 7, in the positive ion mode, the best performance of SVMs-based classification was present when about 300 selected features were applied. In negative ion mode, the best performance of SVMs-based classification was found when about 100 selected features were applied. These methods were able to distinguish TB patients from Non-TB subjects with the accuracy percentage of 89%, sensitivity percentage of 100%, and specificity of 81%. The exemplary analytical methods described above were used to identify multiple TB biomarkers using lipid extraction and high-resolution mass spectrometry in patient samples collected in Masiphumelele, South Africa.

To identify the presence of biological threat agents in the atmosphere, air samples may be collected at predetermined time intervals and analyzed using the exemplary methods disclosed above to generate a historical data set (training data set) of background/baseline information in data analysis system 110. Analysis may be improved by time using machine learning algorithms run in engine 111. Variations in background information may be modeled to map out normal behavior of the atmosphere in a protected area. When a release of biological, biochemical, or chemical aerosol particles is suspected, sampling of air using the exemplary methods described above will result in information that deviates from historical background information. The first signature of the presence of such a threat will be a sharp deviation from the normal background. At this stage, algorithmic decisions may be made as to the composition of each individual particle. Remedial actions can therefore be taken quickly to protect human life and to prevent loss of life.

The exemplary methods and devices disclosed above may also be used for analysis of liquid samples. In this case, an aliquot of the sample may be aerosolized using suitable means. For example, a nebulizer may be used to aerosolize the liquid sample in air. Analyte particles may also be extracted from a swab or may be in the form of a solid sample which may be dissolved using a suitable solvent. An aliquot of the sample may then be aerosolized using suitable means. For example, a nebulizer may be used to aerosolize the liquid sample in air. In addition to bacteria, the disclosed exemplary methods and devices may be used to identify viral and toxins in real-time. By analyzing data collected from one or more optical detector and from mass spectrometry, the biological fingerprint of analyte particles may be obtained in real-time.

The disclosed exemplary methods obviate the need for using complex sample processing steps associated with MALDI TOF-MS, while still producing large informative ions particularly in the case of biological aerosol particles. Further, generation of large molecular fragments may also be improved by treating the aerosol particles using a spray of water or solvent-water mixture before ionization using the IR laser pulse (for example, in method 300). Organic solvents comprising at least one of methanol, ethanol, and isopropanol may be used. The MALDI process requires a sample processing step whereby another chemical (usually a complex organic molecule in a solvent) coats the sample before it is analyzed in the TOF-MS. Methods 200 and 300 may be modified to permit a MALDI matrix (simple matrices such as organic solvents) coating step. The MALDI technique coupled with high-mass-range time-of-flight (TOF) mass spectrometry may also permit direct analysis of large peptide components, and complete proteins enabling "whole cell" biological identification. Commonly owned International Application PCT/US2016/48395 entitled "Coating of Aerosol Particles Using an Acoustic Coater," which is incorporated by reference herein in its entirety, describes conventional MALDI TOF mass spectrometry, provides examples of complex organic MALDI matrices, and discloses methods and devices for applying a coating of a MALDI matrix solution to bio aerosol particles prior to their analysis in an aerosol time-of-flight mass spectrometer.

The Abstract is provided to comply with 37 C.F.R. § 1.72(b), to allow the reader to determine quickly from a cursory inspection the nature and gist of the technical disclosure. It should not be used to interpret or limit the scope or meaning of the claims.

Although the present disclosure has been described in connection with the preferred form of practicing it, those of ordinary skill in the art will understand that many modifications can be made thereto without departing from the spirit of the present disclosure. Accordingly, it is not intended that the scope of the disclosure in any way be limited by the above description.

It should also be understood that a variety of changes may be made without departing from the essence of the disclosure. Such changes are also implicitly included in the description. They still fall within the scope of this disclosure. It should be understood that this disclosure is intended to yield a patent covering numerous aspects of the disclosure both independently and as an overall system and in both method and apparatus modes.

Further, each of the various elements of the disclosure and claims may also be achieved in a variety of manners. This disclosure should be understood to encompass each such variation, be it a variation of an implementation of any apparatus implementation, a method or process implementation, or even merely a variation of any element of these.

Particularly, it should be understood that the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this disclosure is entitled. It should be understood that all actions may be expressed as a means for taking that action or as an element which causes that action. Similarly, each physical element disclosed should be understood to encompass a disclosure of the action which that physical element facilitates.

In addition, as to each term used it should be understood that unless its utilization in this application is inconsistent with such interpretation, common dictionary definitions should be understood as incorporated for each term and all definitions, alternative terms, and synonyms such as contained in at least one of a standard technical dictionary recognized by artisans and the Random House Webster's Unabridged Dictionary, latest edition are hereby incorporated by reference.

Further, the use of the transitional phrase "comprising" is used to maintain the "open-end" claims herein, according to traditional claim interpretation. Thus, unless the context requires otherwise, it should be understood that variations such as "comprises" or "comprising," are intended to imply the inclusion of a stated element or step or group of elements or steps, but not the exclusion of any other element or step or group of elements or steps. Such terms should be interpreted in their most expansive forms so as to afford the applicant the broadest coverage legally permissible.

REFERENCES

1. Wan G-H, Wu C-L, Chen Y-F, Huang S-H, Wang Y-L, et al. (2014), "Particle Size Concentration Distribution and Influences on Exhaled Breath Particles in Mechanically Ventilated Patients," PLoS ONE 9(1): e87088.
2. Castanedo, F., "A Review of Data Fusion Techniques," The Scientific World Journal, 2013.
3. Warschat, C. et al., "Mass Spectrometry of Levitated Droplets by Thermally Unconfined Infrared-Laser Desorption," *Anal. Chem.* 2015, 87, 8323-8327.

What is claimed is:

1. A system for identifying the composition of bioaerosol particles without pre-treatment of the bioaerosol particles using complex organic MALDI matrices, the system comprising:
   an aerosol beam generator to generate a beam of single particles;
   a continuous laser generator to generate a single continuous laser, in association with a data analysis system, configured to:
      index each particle in the beam of single particles;
      optically characterize in association with one or more laser scattering devices, particle size, particle shape, and fluorescence of each indexed particle, and generate optical data; and select which indexed particle is to be ionized;

a pulse ionization laser generator triggered by the continuous laser, having an ionization region of less than about 150 μm in diameter and configured to simultaneously generate an IR laser pulse and an UV laser pulse when each selected indexed particle reaches the ionization region, and is simultaneously exposed to the IR laser pulse and the UV laser pulse to produce at least one of ionized fragments of each selected indexed particle and photons associated with each selected indexed particle, wherein the molecular weight of each ionized fragment is between about 1 kDa and 150 kDa; and, a TOFMS detector to analyze the ionized fragments associated with each selected indexed particle and generate unique mass spectral data associated with each selected indexed particle, wherein the data analysis system is further configured to:

compile the optical data with unique mass spectral data associated with each selected indexed particle using data fusion; and compare the compiled optical data with a training data set comprising of a knowledge base of known biological matter to predict composition of the bioaerosol particles.

2. The system of claim 1, wherein the IR laser pulse is characterized by a wavelength of between about 1.0 micrometer and about 1.2 micrometer.

3. The system of claim 1, wherein the UV laser pulse is characterized by a wavelength of between about 250 nm and about 400 nm.

4. The system of claim 1, wherein the wavelength of the IR pulse is about 1.06 micrometer.

5. The system of claim 1, wherein the wavelength of the UV pulse is about 355 nm.

6. The system of claim 1, wherein the IR laser pulse width is between about 1 ns and about 10 ns.

7. The system of claim 1, wherein the IR laser pulse repetition rate is about 1 kHz.

8. The system of claim 1, wherein the travel time of each particle from the aerosol beam generator to the ionization region of the ionization pulse laser is less than about 1 s.

9. The system of claim 1, wherein the pulse ionization laser generator includes a Nd:YAG laser generator configured to simultaneously generate an IR laser pulse and an UV laser pulse.

10. The system of claim 1, wherein the data analysis system is further configured to:

improve the prediction of composition over time using machine learning methods implemented using a machine learning engine disposed in data communication with the data analysis system.

11. The system of claim 1, wherein the pulse ionization laser power density is between about 1 $MW/cm^2$ and about 20 $MW/cm^2$.

12. A method for identifying the composition of bioaerosol particles without pre-treatment of the bioaerosol particles using complex organic MALDI matrices, the method comprising:

generating an aerosol particle beam of single particles using an aerosol beam generator;

using a single continuous laser, in association with a data analysis system:

indexing each particle in the beam of single particles;

optically characterizing in association with one or more laser scattering devices, particle size, particle shape, and fluorescence of each indexed particle, and generating optical data; and selecting which indexed particle is to be ionized;

triggering an ionization pulse laser generator using the continuous laser to simultaneously generate an IR laser pulse and an UV laser pulse when each selected indexed particle reaches the ionization region of the ionization pulse laser and simultaneously exposing each particle to the IR laser pulse and the UV laser pulse laser to produce at least one of ionized fragments of each selected indexed particle and photons associated with each selected indexed particle, wherein the molecular weight of each ionized fragment is between about 1 kDa and about 150 kDa;

analyzing the ionized fragments of each selected indexed particle using a TOFMS detector to generate unique mass spectral data associated with each selected indexed particle; and, determining the composition of each selected indexed particle by:
compiling the optical data with unique mass spectral data associated with each selected indexed particle using data fusion; and
comparing the compiled data with a training data set comprising of a knowledge base of known biological matter to predict composition of the bioaerosol particles.

13. The method of claim 12, wherein selecting which indexed particle is to be ionized comprises determining whether at least one of particle size, particle shape, and fluorescence of the indexed particle meets a predetermined threshold value.

14. The method of claim 12, wherein the determining the composition step further comprises:
improving the prediction of composition over time using machine learning methods implemented using a machine learning engine disposed in data communication with the data analysis system.

15. The method claim 12, wherein the IR laser pulse is characterized by a wavelength of between about 1.0 micrometer and about 1.2 micrometer.

16. The method claim 12, wherein the UV laser pulse is characterized by a wavelength of between about 250 nm and about 400 nm.

* * * * *